(12) United States Patent
Wang et al.

(10) Patent No.: US 10,054,160 B1
(45) Date of Patent: Aug. 21, 2018

(54) END SEAL DEVICE OF A LINEAR GUIDE

(71) Applicant: AIRTAC INTERNATIONAL GROUP, Grand Cayman (KY)

(72) Inventors: Shih-Chung Wang, New Taipei (TW); Chang-Ye Li, Tainan (TW); Kuo-Tung Ho, Tainan (TW); Chia-Hao Ho, Tainan (TW)

(73) Assignee: AIRTAC INTERNATIONAL GROUP, Grand Cayman (KY)

( * ) Notice: Subject to any disclaimer, the term of this patent is extended or adjusted under 35 U.S.C. 154(b) by 0 days.

(21) Appl. No.: 15/647,578

(22) Filed: Jul. 12, 2017

(30) Foreign Application Priority Data

Mar. 29, 2017 (TW) .............................. 106204407 U

(51) Int. Cl.
| | |
|---|---|
| *F16C 29/06* | (2006.01) |
| *F16C 33/72* | (2006.01) |
| *F16C 33/74* | (2006.01) |
| *F16C 29/08* | (2006.01) |
| *F16C 33/66* | (2006.01) |
| *F16C 29/00* | (2006.01) |

(52) U.S. Cl.
CPC ........ *F16C 29/086* (2013.01); *F16C 29/0609* (2013.01); *F16C 29/0669* (2013.01); *F16C 33/6611* (2013.01); *F16C 33/6622* (2013.01); *F16C 29/005* (2013.01); *F16C 29/0638* (2013.01)

(58) Field of Classification Search
CPC ................ F16C 29/005; F16C 29/0638; F16C 29/0669; F16C 29/086; F16C 33/6611; F16C 33/6622; F16C 33/06; F16C 33/72; F16C 33/76; F16C 29/0609
USPC ........... 384/15, 13, 43–45, 49; 277/345, 399
See application file for complete search history.

(56) References Cited

U.S. PATENT DOCUMENTS

| | | | | |
|---|---|---|---|---|
| 5,149,204 | A | * | 9/1992 | Tennichi ............. F16C 29/0642 384/15 |
| 5,492,413 | A | * | 2/1996 | Tsukada .............. F16C 29/0647 384/15 |
| 5,590,965 | A | * | 1/1997 | Yabe ................... F16C 29/0647 384/15 |
| 6,155,717 | A | * | 12/2000 | Michioka ............ F16C 29/0642 384/13 |
| 6,401,867 | B1 | * | 6/2002 | Michioka ................. B23Q 1/58 184/100 |

(Continued)

FOREIGN PATENT DOCUMENTS

| DE | 4334776 | A1 | * | 4/1994 | ............ B25J 18/02 |
|---|---|---|---|---|---|
| DE | 102005027513 | A1 | * | 12/2006 | ............ F16C 29/08 |

(Continued)

*Primary Examiner* — Marcus Charles
(74) *Attorney, Agent, or Firm* — Burris Law, PLLC

(57) ABSTRACT

An end seal device of a linear guide includes a main plate and a cladding member. The main plate includes an upper portion, two engaging portions extending downwardly and bent rearwardly from the upper portion, and two lower contact portions extending downwardly from the engaging portions and each having a penetrating hole. The cladding member includes cladding portions respectively attached to major surfaces of the main plate, and two filling portions each filling the penetrating hole to interconnect the cladding portions for firmly covering and protecting the main plate.

9 Claims, 12 Drawing Sheets

(56) References Cited

U.S. PATENT DOCUMENTS

| | | | |
|---|---|---|---|
| 7,410,300 B2* | 8/2008 | Chen | F16C 29/0602 384/13 |
| 7,556,430 B2* | 7/2009 | Wu | F16C 29/0609 184/5 |
| 7,789,564 B2* | 9/2010 | Keller | F16C 29/086 384/15 |
| 7,909,512 B2* | 3/2011 | Kuwabara | F16C 33/6648 184/5 |
| 8,251,586 B2* | 8/2012 | Kondo | F16C 29/0609 184/5 |
| 2005/0238266 A1* | 10/2005 | Nakagawa | F16C 29/0642 384/15 |
| 2012/0073396 A1* | 3/2012 | Kawaguchi | F16C 29/0652 74/424.82 |
| 2013/0195386 A1* | 8/2013 | Matsumoto | F16C 29/086 384/13 |
| 2014/0321777 A1* | 10/2014 | Yoshida | F16C 29/0609 384/15 |

FOREIGN PATENT DOCUMENTS

| | | | | |
|---|---|---|---|---|
| JP | 2002139036 A | * | 5/2002 | ............ F16C 33/76 |
| JP | 2002266858 A | * | 9/2002 | ............ F16C 29/086 |
| JP | 2011241967 A | * | 12/2011 | ............ F16C 29/06 |
| JP | 2014111982 A | * | 6/2014 | ............ F16C 29/06 |
| JP | 5724216 B2 | * | 5/2015 | ............ F16C 33/76 |

* cited by examiner

END SEAL DEVICE OF A LINEAR GUIDE

CROSS-REFERENCE TO RELATED APPLICATION

This application claims priority of Taiwanese Patent Application No. 106204407, filed on Mar. 29, 2017.

FIELD

The disclosure relates to a linear guide, and more particularly to an end seal device of a linear guide mounted on a slider for sealing lubricant therein.

BACKGROUND

As shown in FIGS. 1 to 3, a conventional linear guide includes a guide rail 81, a slider 82 slidably striding the guide rail 81, a plurality of rollers 83 disposed between the guide rail 81 and the slider 82, two end caps 84 mounted on two sides of the slider 82, two end seals 9 respectively secured on the end caps 84, a plurality of screws 85 (only one is shown in FIG. 1) disposed to fasten the end caps 84 and the end seals 9 to the slider 82, and a grease nipple 86 for introducing lubricant grease. The guide rail 81 has two raceway grooves 811 at left and right sides. Each end seal 9 has two contact portions 90 extending in the raceway grooves 811 for removing grease, dust and foreign objects in the grooves 811. The rollers 83 are ball bearings for facilitating smooth movement of the slider 82 on the guide rail 81. The end seals 9 are disposed to seal lubricant grease stored inside the slider 82, and scrape dust and foreign objects on the guide rail 81 to prevent the dust and foreign objects from entering the slider 82 and further adversely affecting rolling of the rollers 83.

Referring to FIGS. 1, 2 and 4, each end seal 9 includes a metal-made main plate 91 and a plastic-made cladding member 92 attached to the main plate 91. The main plate 91 includes an upper portion 911, two lower contact portions 912 disposed below the upper portion 911 and spaced apart from each other, and a deflecting portion 913 extending from the upper portion 911 to engage the contact portions 912. The main plate 91 has opposite first and second major surfaces 914, 915 defined by the upper portion 911, the lower contact portions 912 and the deflecting portion 913. The upper portion 911 has two fastened holes 916 for passage of screws 85, and a through hole 917 for receiving the grease nipple 86. With the deflecting portion 913 that interconnects the upper portion 911 and the lower contact portions 912, the lower contact portions 912 are disposed remote from the respective end cap 84 relative to the upper portion 911.

Referring to FIGS. 2, 4 and 5, the cladding member 92 includes a first cladding portion 921 attached to the first major surface 914 at the lower contact portions 912 so as to be coplanar to the upper portion 911, and a second cladding portion 922 attached to the second major surface 915.

In making of the end seal 9, the main plate 91 is placed in a mold (not shown) where the fastened holes 916 and the through hole 917 are blocked. A molten plastic material is introduced into the mold to surround the main plate 91 and to cure so as to form the cladding member 92. To reinforce the connection between the cladding member 92 and the main plate 91, an adhesive is needed, and is disposed on the main plate 91 to adhere thereto through a coating process (e.g. spreading, dip coating, etc.). Subsequently, drying and plastic coating processes must be performed, which renders the fabrication of the end seal 9 troublesome and inconvenient.

Moreover, as shown in FIGS. 1, 4 and 5, since the first major surface 914 of the main plate 91 at the upper portion 911 that abuts against and is fastened to the end cap 84 is relatively rigid and is hence designed not to be surrounded by the softer cladding member 92, formation of the deflecting portion 913 is required such that the first cladding portion 921 of the cladding member 92 is attached only to the lower contact portions 912. However, under the circumstance that no cladding is applied to the upper portion 911 of the main plate 91 which is a thin metal plate, the mere structural strength of the end seal 9 is not sufficient enough, i.e. the end seal 9 is still liable to breakage at the upper portion 911 and detachment and split of the cladding member 92 below the through hole 917.

SUMMARY

Therefore, an object of the disclosure is to provide an end seal device of a linear guide that can alleviate at least one of the drawbacks of the prior art.

According to the disclosure, the end seal device of a linear guide, which includes a guide rail extending in a longitudinal direction, and a slider unit striding the guide rail to make a reciprocating movement therealong, is cooperatively connected with the slider unit. The end seal device includes a main plate and a cladding member. The main plate includes an upper portion which has two attached sections that are opposite to each other in a transverse direction transverse to the longitudinal direction and that are adapted to be attached to the slider unit, and a middle section that is disposed between the attached sections, two engaging portions which extend downwardly from the attached sections, respectively, and two lower contact portions which extend downwardly from the engaging portions, respectively, and which are spaced apart from each other in the transverse direction. The main plate has a first major surface which is defined by the upper portion, the engaging portions and the lower contact portions and which faces the slider unit, and a second major surface which is opposite to the first major surface in the longitudinal direction. Each of the middle section and the lower contact portions is disposed remote from the slider unit relative to the attached sections in the longitudinal direction so as to be spaced apart from the slider unit when the attached sections are attached to the slider unit. Each of the lower contact portions has a penetrating hole which extends from the first major surface to the second major surface. The cladding member is made from a material less rigid than that of the main plate, and includes a first cladding portion which is attached to the first major surface, a second cladding portion which is attached to the second major surface, and two filling portions each of which fills a respective one of the penetrating holes and extends in the longitudinal direction to interconnect the first and second cladding portions.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
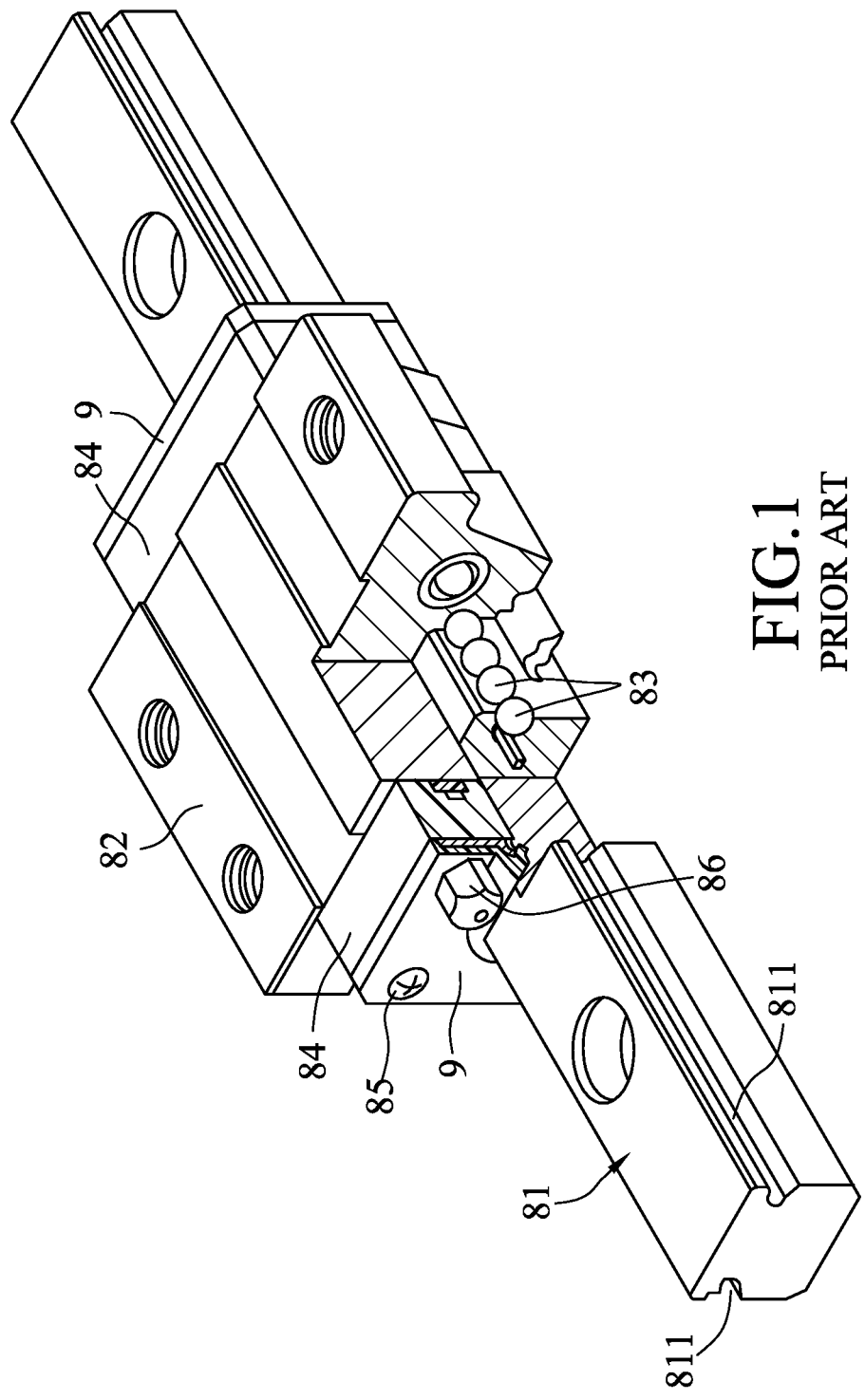
FIG. 1 is a partly sectioned perspective view of a conventional linear guide.
Figure 2:
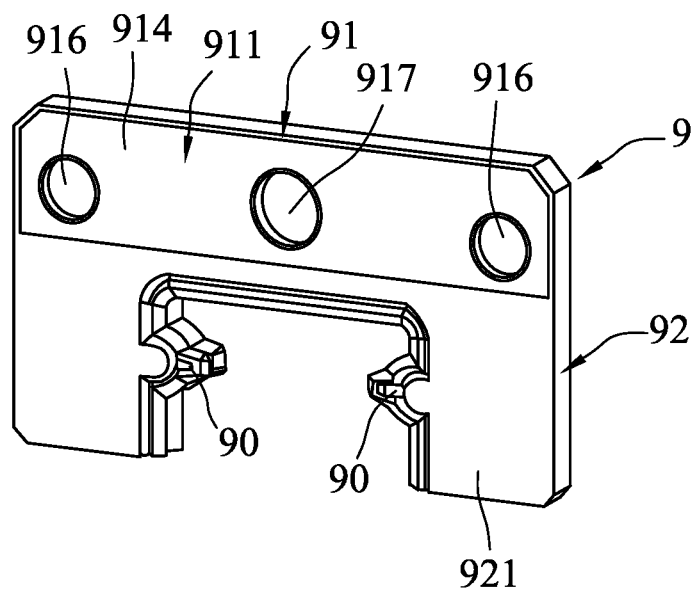
FIG. 2 is a perspective view of an end seal of the conventional linear guide.
Figure 3:
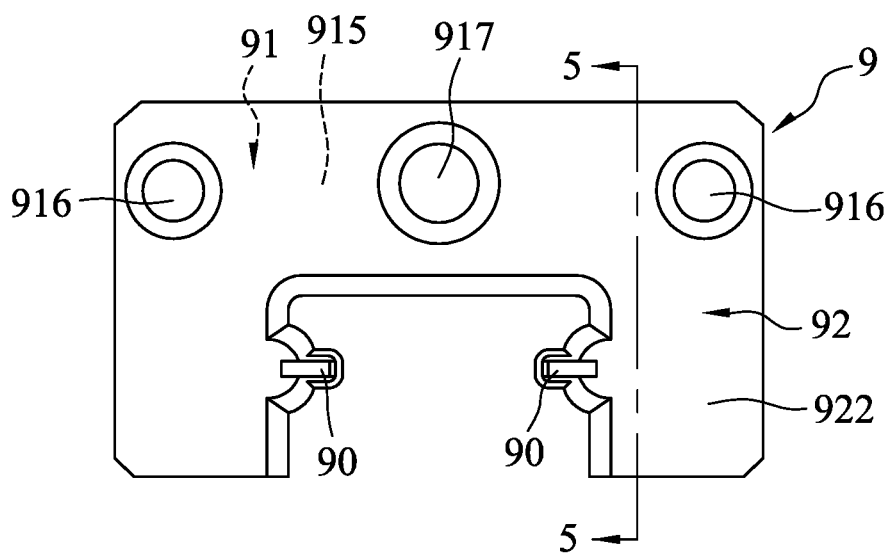
FIG. 3 is a plan view of the end seal seen from another side opposite to that in FIG. 2.
Figure 4:
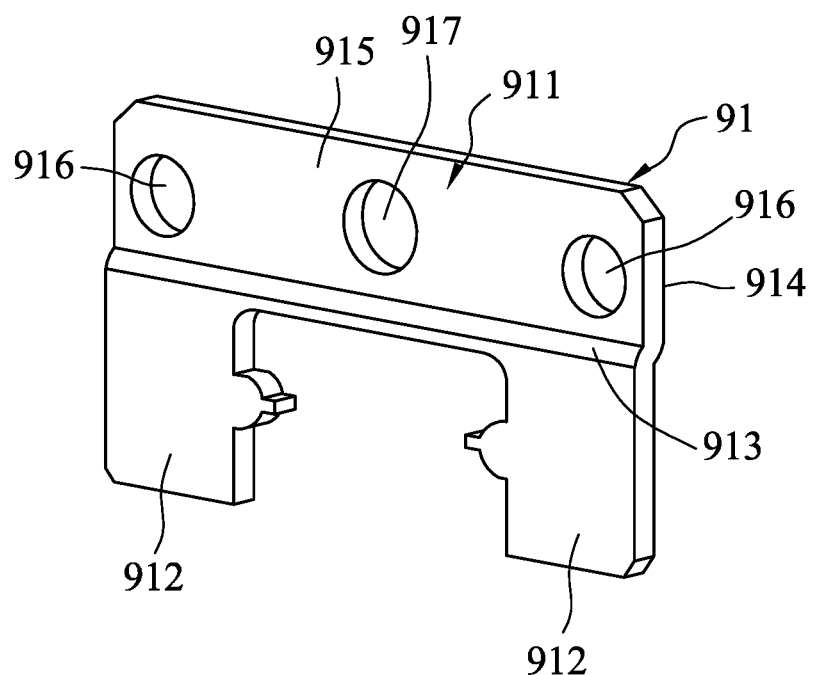
FIG. 4 is a perspective view of a main plate of the end seal.
Figure 5:
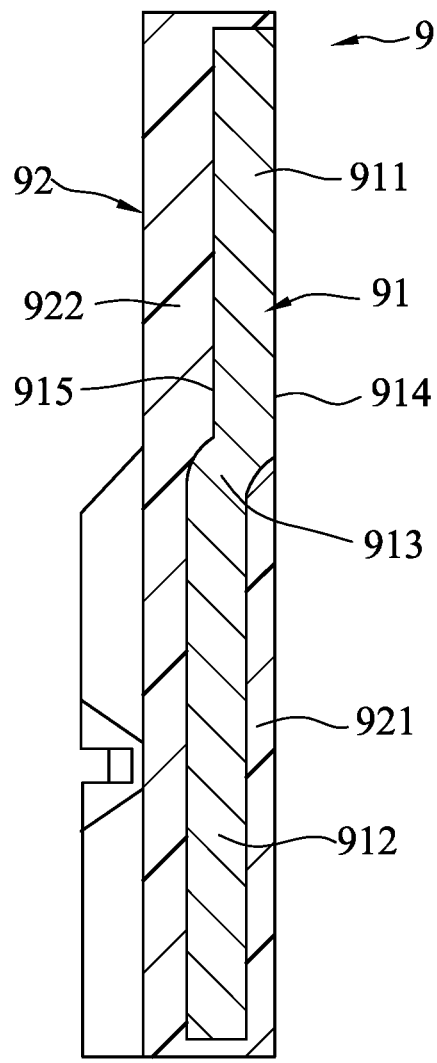
FIG. 5 is a sectional view taken along line 5-5 of FIG. 3.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 6:
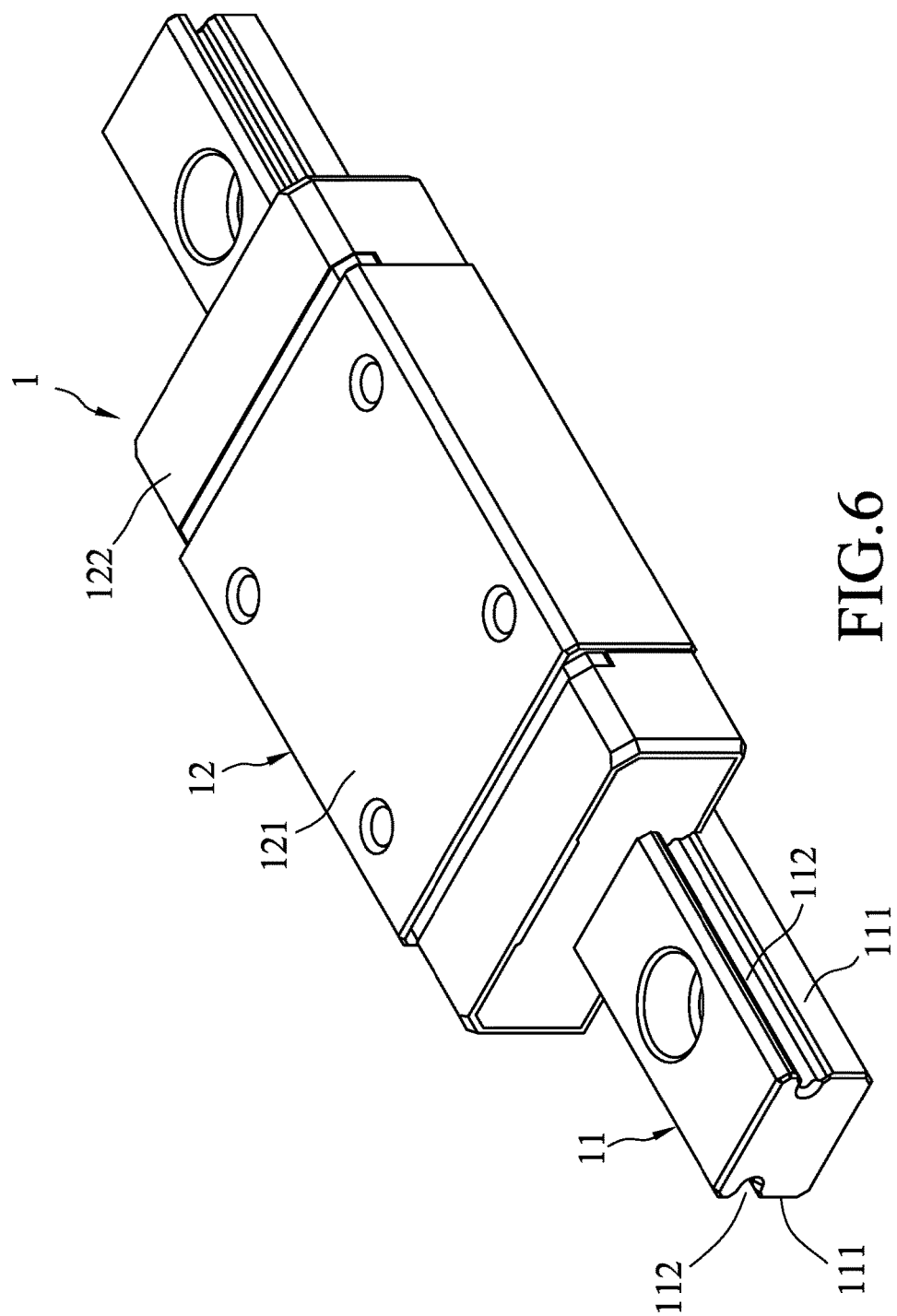
FIG. 6 is a perspective view illustrating a first embodiment of an end seal device incorporated in a linear guide according to the disclosure.
Figure 7:
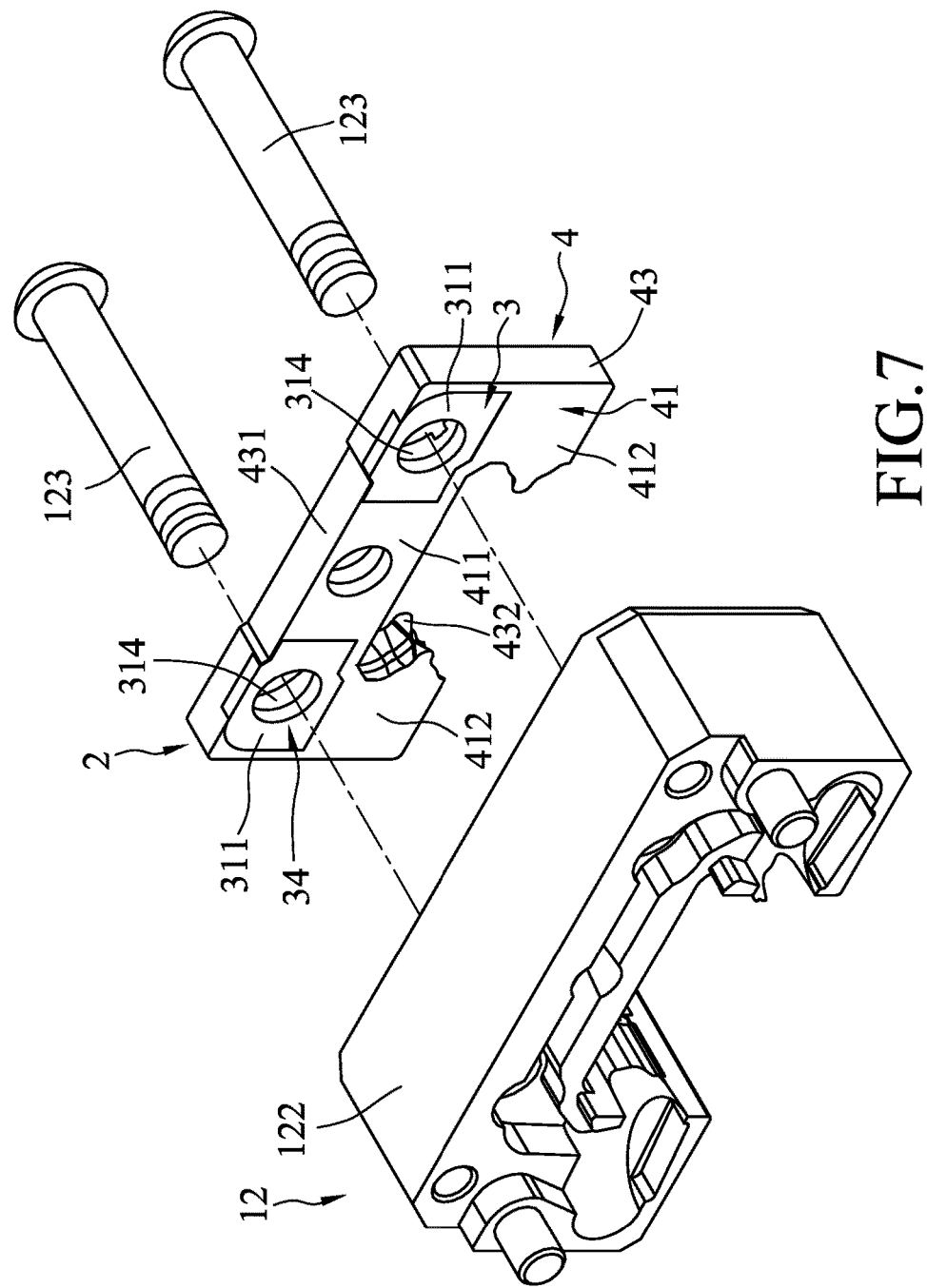
FIG. 7 is an exploded perspective view illustrating the end seal device of the first embodiment and an end cap and two screws of the linear guide.

Referring to FIGS. 6 and 7, a first embodiment of an end seal device 2 is incorporated in a linear guide 1. The linear guide 1 includes a guide rail 11 extending in a longitudinal direction, a slider unit 12 striding the guide rail 11 to make a reciprocating movement therealong, and a plurality of steel balls (not shown) disposed in the slider unit 12 for facilitating movement of the slider unit 12. The guide rail 11 has left and right side walls 111 opposite to each other in a transverse direction transverse to the longitudinal direction, and each having a longitudinally-extending raceway groove 112. The slider unit 12 includes a slider 121, an end cap 122 mounted on an end of the slider 121, and two screws 123. The end seal device 2 of this embodiment is cooperatively connected with the end cap 122. The end seal device 2 and the end cap 122 are fastened on the slider 121 through the screws 123. The end seal device 2 includes a main plate 3 and a cladding member 4.

Figure 8:
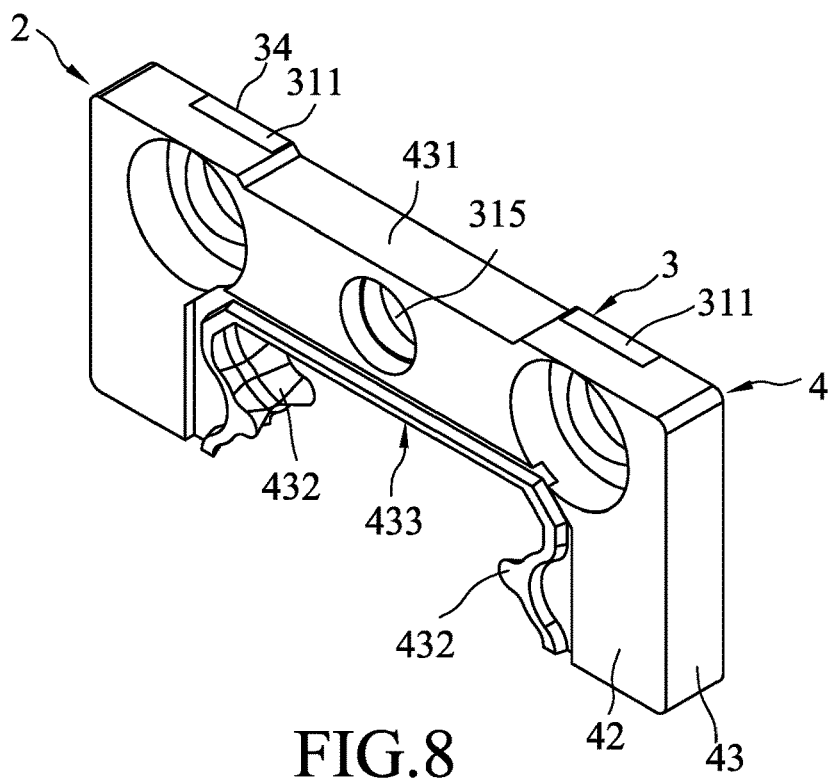
FIG. 8 is a perspective view of the end seal device of the first embodiment seen from another side opposite to that in FIG. 7.
Figure 9:
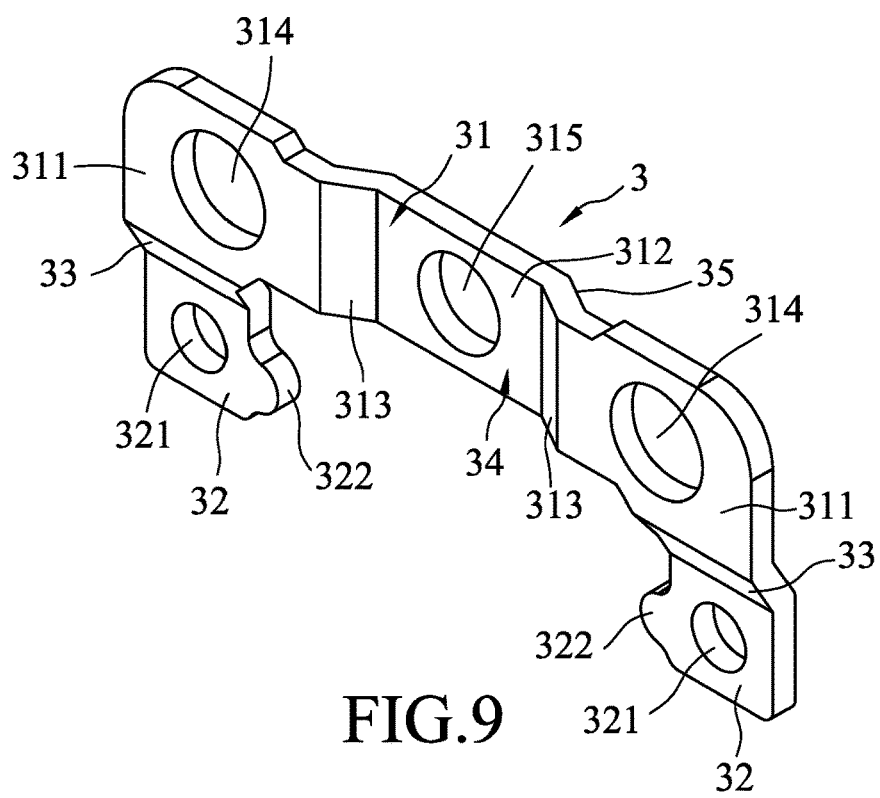
FIG. 9 is a perspective view of a main plate of the end seal device of the first embodiment.

With reference to FIGS. 7 to 9, the main plate 3 is a single piece integrally made from a metallic plate, and is configured by a punching process. The main plate 3 includes an upper portion 31 which is mounted with the end cap 122 and above the guide rail 11, two engaging portions 33 which extend downwardly from a lower edge of the upper portion 31, and two lower contact portions 32 which extend downwardly from the engaging portions 33, respectively, and which are spaced apart from each other in the transverse direction. The main plate 3 has a first major surface 34 which is defined by the upper portion 31, the engaging portions 33 and the lower contact portions 32 and which faces the slider unit 12, and a second major surface 35 which is opposite to the first major surface 34 in the longitudinal direction. In this embodiment, the first major surface 34 faces forwardly, and the second major surface 35 faces rearwardly.

Figure 10:
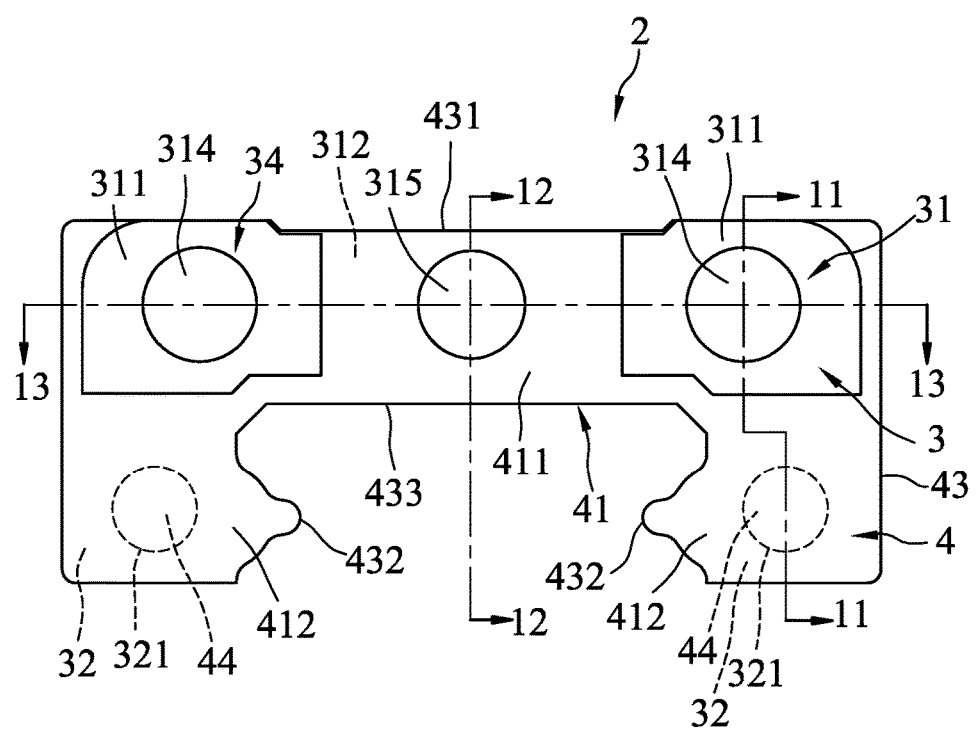
FIG. 10 is a front view of the first embodiment.

Referring to FIGS. 7, 9 and 10, the upper portion 31 has two attached sections 311 which are opposite to each other in the transverse direction and which are adapted to be attached to the slider unit 12, a middle section 312 which is disposed between the attached sections 311 and which is disposed remote from the slider unit 12 relative to the attached sections 311 in the longitudinal direction, and two deflecting sections 313 which respectively extend from the attached sections 311 away from the slider unit 12 to engage left and right sides of the middle section 312, respectively. Each attached section 311 has a fastened hole 314 which extends from the first major surface 34 to the second major surface 35 for passage of a screw 123 to be secured to the slider unit 12. The middle section 312 has a through hole 315 which extends from the first major surface 34 to the second major surface 35 for mounting other component parts of the linear guide 1.

Figure 11:
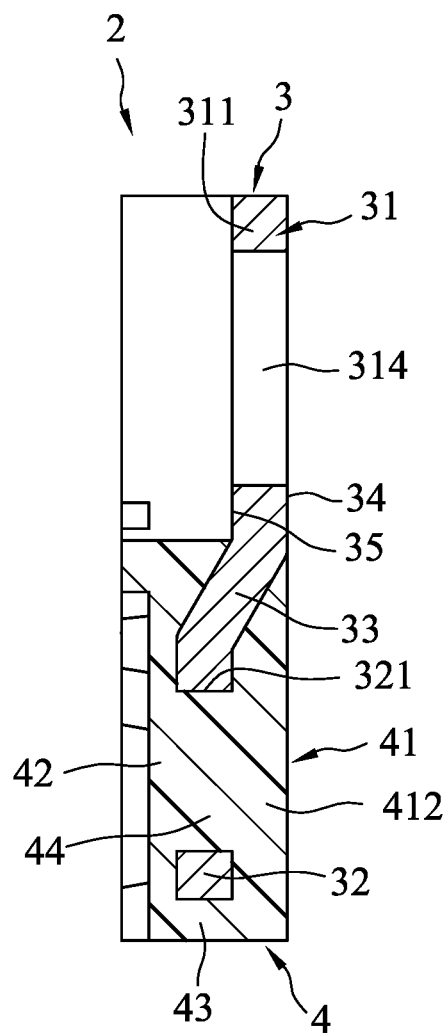
FIG. 11 is a sectional view taken along line 11-11 of FIG. 10.
Figure 12:
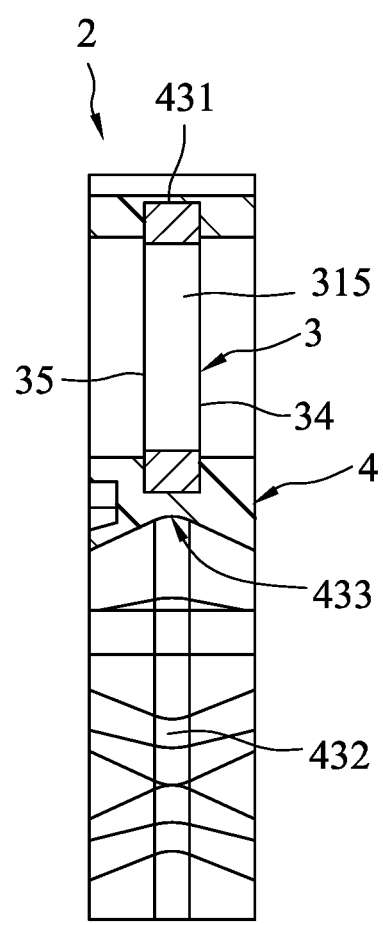
FIG. 12 is a sectional view taken along line 12-12 of FIG. 10.
Figure 13:
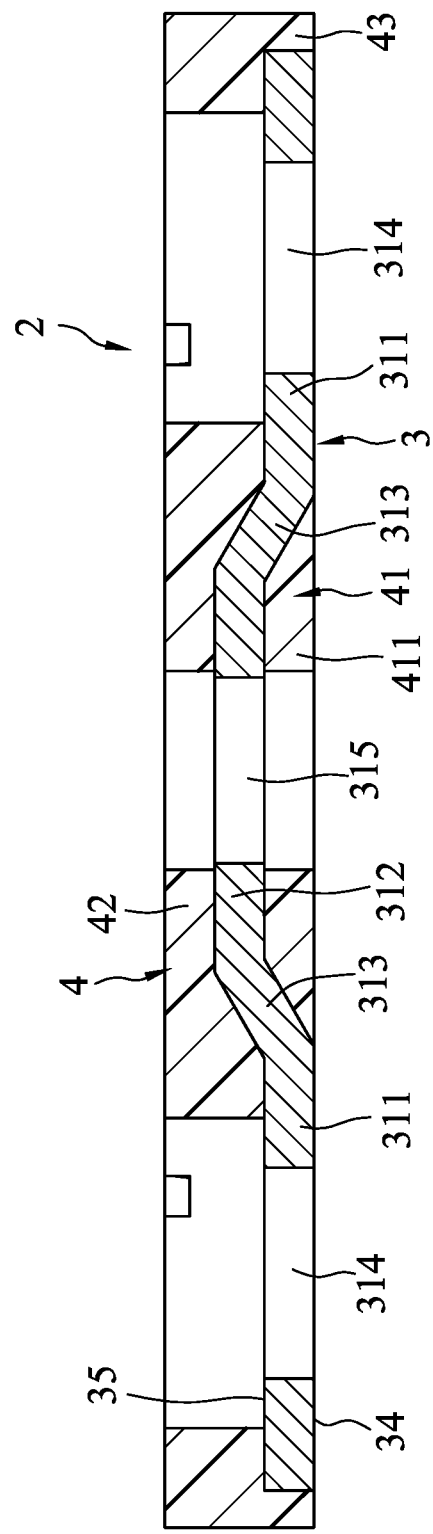
FIG. 13 is a sectional view taken along line 13-13 of FIG. 10.

Referring to FIGS. 6, 9 and 11, in this embodiment, the lower contact portions 32 are remote from the slider unit 12 relative to the attached sections 311 in the longitudinal direction and are on the same vertical plane as the middle section 312 so as to be spaced apart from the slider unit 12 when the attached sections 311 are attached to the slider unit 12. In this embodiment, the lower contact portions 32 are placed at the left and right sides of the guide rail 11. Each lower contact portion 32 has a penetrating hole 321 which extends from the first major surface 34 to the second major surface 35, and a projecting lip 322 which extends toward the respective raceway groove 112 of the guide rail 11. The engaging portions 33 extend downwardly and rearwardly from the lower edges of the attached sections 311, respectively, to engage the upper edges of the lower contact portions 32, respectively.

Referring to FIGS. 8 to 10, the cladding member 4 is made from a plastic material which is less rigid than the metallic material of the main plate 3, and includes a first cladding portion 41 which is attached to the first major surface 34, a second cladding portion 42 which is attached to the second major surface 35, a surrounding cladding portion 43 which extends along a profile of the main plate 3 and which interconnects the first and second cladding portions 41, 42, and two filling portions 44 each of which fills a respective one of the penetrating holes 321 and extends in the longitudinal direction to interconnect the first and second cladding portions 41, 42.

Referring to FIGS. 10 to 13, the first cladding portion 41 includes an upper cladding section 411 covering the middle section 312, and two lower cladding sections 412 respectively covering the lower contact portions 32 and engaging a lower edge of the upper cladding section 411. The first cladding portion 41 does not extend over the first major surface 34 at the attached sections 311 such that the first major surface 34 at the attached sections 311 is coplanar with an outer surface of the first cladding portion 41 so as to corporately define a plane that is normal to the longitudinal direction.

The second cladding portion 42 is provided to substantially cover the second major surface 35 so as to extend over all the attached sections 311 and the middle section 312 of the upper portion 31, the lower contact portions 32 and the engaging portions 33, and has an outer surface which is a plane that is normal to the longitudinal direction. The surrounding cladding portion 43 has a reinforcing section 431 which is attached to an upper minor surface of the middle section 312 and which extends in the longitudinal direction to interconnect the upper cladding section 411 of the first cladding portion 41 and the second cladding portion 42, two contact sections 432 which respectively cover the projecting lips 322, and an upper rim section 433 which interconnects upper ends of the contact sections 432. The contact sections 432 are disposed to respectively extend in the raceway grooves 112 of the guide rail 11 (see FIG. 6) so as to scrape dust and foreign objects in the guide rail 11. Each filling portion 44 extends from the respective lower cladding section 412 to connect the second cladding portion 42. The cladding member 4 does not extend in the fastened holes 314 and the through hole 315 to keep them vacuous for use. However, the cladding member 4 may be partly inserted into the through hole 315 to not fully occupy the same.

With reference to FIGS. 9 to 11, in making of the end seal device 2, the main plate 3 is placed in a mold (not shown) where the fastened holes 314 and the through hole 315 are blocked. Subsequently, a plastic-covering process, where a molten plastic material is introduced into the mold to surround the main plate 3 and to cure so as to form the cladding member 4 that integrally covers the main plate 3, is performed. The plastic material of the cladding member 4 can fill the penetrating holes 321 to form the filling portions 44 that interconnect the first and second cladding portions 41, 42, which increases the cladding effect of the cladding member 4 to enable the cladding member 4 to be attached firmly to the main plate 3 without the need of a surface adhesive.

Further, with the middle section 312 disposed rearwardly of the attached sections 311, a recessed space is formed on the first major surface 34 for the plastic material of the cladding member 4 to fill during the plastic-covering process and to be coplanar with the attached sections 311. Thus, when the end seal device 2 is mounted on the slider unit 12 (see FIG. 6), the rigid attached sections 311 can be directly attached to the end cap 122 for complying with requirements of a linear guide, while the cladding member 4 covers the first major surface 34 at the middle section 312 and the second major surface 35 to have a great covering effect and to reinforce protection of the upper rim section 433.

Furthermore, in this embodiment, the upper minor surface of the middle section 312 is lower than upper minor surfaces of the attached sections 311 to ensure that the plastic material can fill the space at the upper minor surface of the middle section 312 so as to form the reinforcing section 431. With the reinforcing section 431 which interconnects the first and second cladding portions 41, 42, the covering and coupling effects and the structural strength of the cladding member 4 can be enhanced. Moreover, the upper rim section 433 which is integrally connected with the first and second cladding portions 41, 42 is prevented from breakage caused from friction generated during a scraping process.

As illustrated, with the configuration of the main plate 3 and the penetrating holes 321 which the filling portions 44 fill to engage the first and second cladding portions 41, 42, the cladding member 4 can be firmly attached to the main plate 3 without the need of additional adhesives and is able to sufficiently protect and support the main plate 3 of the end seal device 2 for prolonging the service life.

Figure 14:
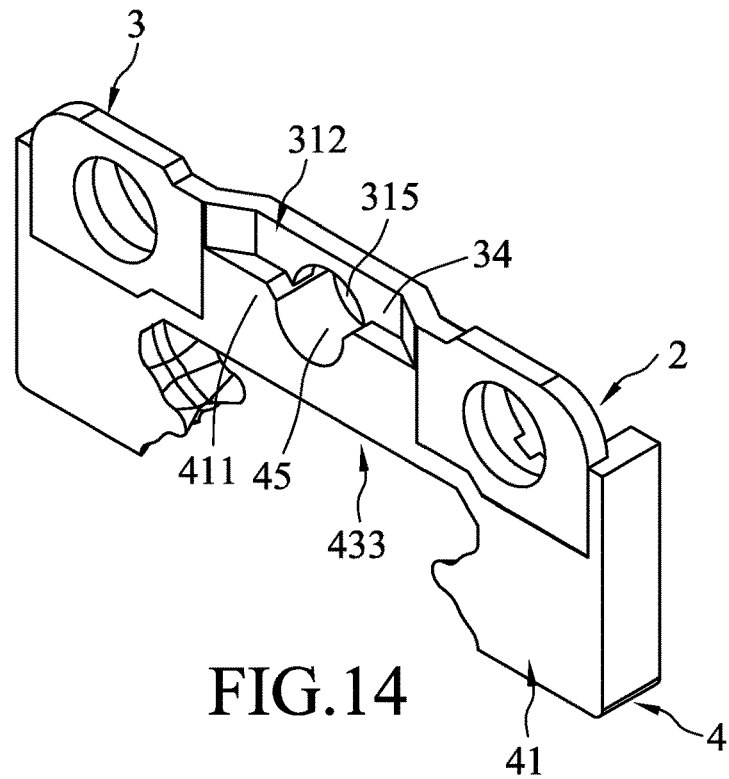
FIG. 14 is a perspective view illustrating a second embodiment of an end seal device according to the disclosure.
Figure 15:
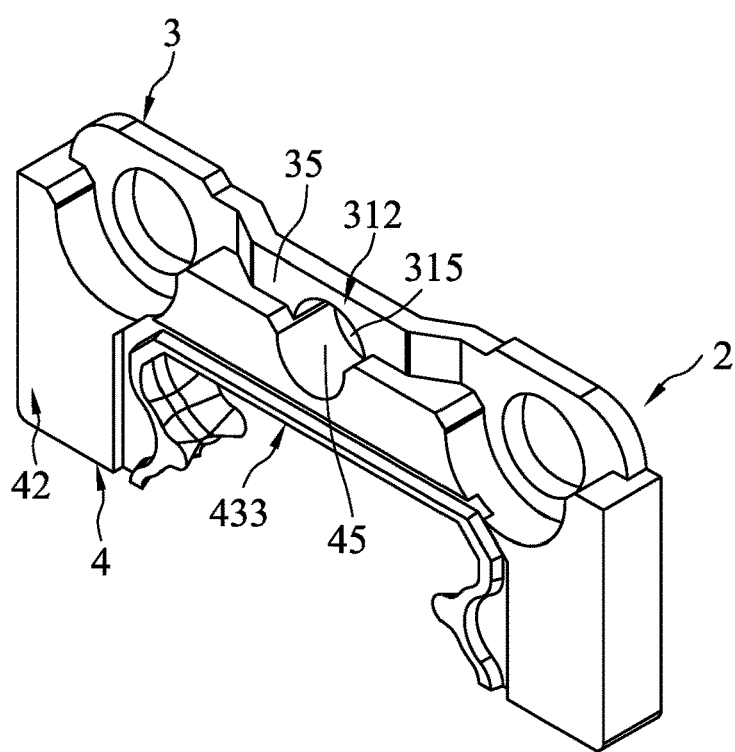
FIG. 15 is a perspective view of the second embodiment seen from another side.

Referring to FIGS. 14 and 15, in a second embodiment, the upper cladding section 411 of the first cladding portion 41 is attached to the first major surface 34 at a part of the middle section 312, such as a lower half of the middle section 312 and a portion slightly above a central portion of the through hole 315. Similarly, the second cladding portion 42 is attached to a part of the second major surface 35. The plastic material of the cladding member 4 extends into a part of the through hole 315 to form an extension portion 45 which interconnects the first and second cladding portions 41, 42 so as to reinforce the structure at the through hole 315.

Figure 16:
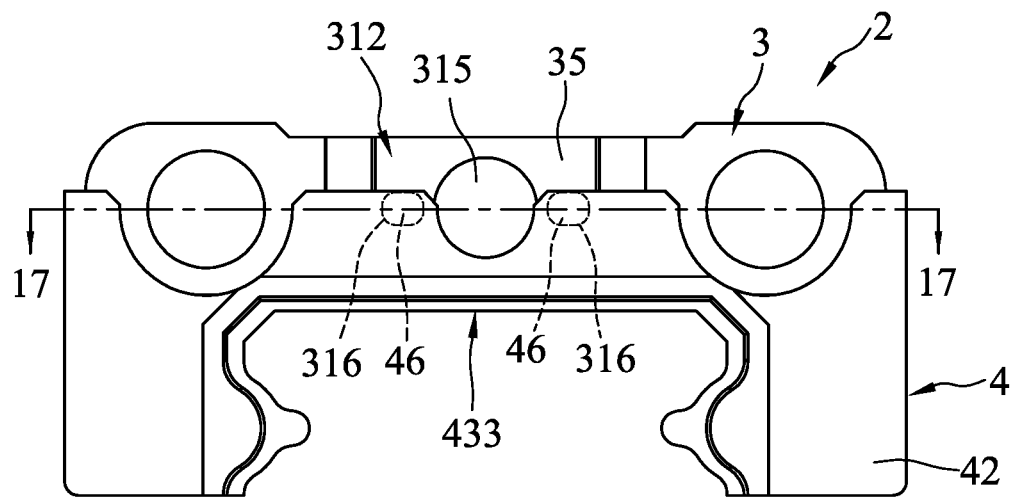
FIG. 16 is a rear view illustrating a third embodiment of an end seal device according to the disclosure.
Figure 17:
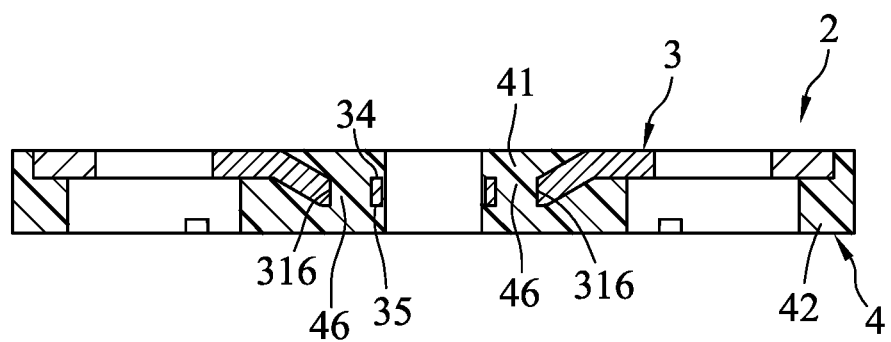
FIG. 17 is a sectional view taken along line 17-17 of FIG. 16.

Referring to FIGS. 16 and 17, in a third embodiment, the middle section 312 has two auxiliary through holes 316 which are formed at left and right sides of the through hole 315 and each of which extends from the first major surface 34 to the second major surface 35. The cladding member 4 further includes two auxiliary filling portions 46 which respectively fill the auxiliary through holes 316 and each of which extends in the longitudinal direction to interconnect the first and second cladding portions 41, 42. Thus, the structural strength of the cladding member 4 can be reinforced to be attached firmly to the main plate 3, steadily supporting the upper rim section 433. The number of the auxiliary through holes 316 and the auxiliary filling portions 46 may be varied, such as only one, three or more.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An end seal device of a linear guide which includes a guide rail extending in a longitudinal direction, and a slider unit striding the guide rail to make a reciprocating movement along the guide rail, said end seal device being cooperatively connected with the slider unit, and comprising:

a main plate including an upper portion which has two attached sections that are opposite to each other in a transverse direction transverse to the longitudinal direction and that are adapted to be attached to the slider unit, and a middle section that is disposed between said attached sections, two engaging portions which extend downwardly from said attached sections, respectively, and two lower contact portions which extend downwardly from said engaging portions, respectively, and which are spaced apart from each other in the transverse direction, said main plate having a first major surface and a second major surface which are defined by said upper portion, said engaging portions and said lower contact portions and which are opposite to each other, said first major surface facing the slider unit, each of said middle section and said lower contact portions being disposed remote from the slider unit relative to said attached sections in the longitudinal direction so as to be spaced apart from the slider unit when said attached sections are attached to the slider unit, each of said lower contact portions having a penetrating hole which extends from said first major surface to said second major surface; and a cladding member made from a material less rigid than that of said main plate, and including a first cladding portion which is attached to said first major surface, a second cladding portion which is attached to said second major surface, and two filling portions each of which fills a respective one of said penetrating holes and extends in the longitudinal direction to interconnect said first and second cladding portions.

2. The end seal device as claimed in claim 1, wherein said cladding member further includes a surrounding cladding portion which extends along a profile of said main plate and which interconnects said first and second cladding portions.

3. The end seal device as claimed in claim 2, wherein each of said attached sections has a fastened hole which extends from said first major surface to said second major surface for passage of a fastener to be secured to the slider unit.

4. The end seal device as claimed in claim 3, wherein said middle section has a through hole which extends from said first major surface to said second major surface, said surrounding cladding portion having a reinforcing section which is attached to an upper minor surface of said middle section and which extends in the longitudinal direction to interconnect said first and second cladding portions.

5. The end seal device as claimed in claim 4, wherein said upper minor surface of said middle section is lower than upper minor surfaces of said attached sections.

6. The end seal device as claimed in claim 1, wherein said first major surface at said attached sections is coplanar with an outer surface of said first cladding portion so as to corporately define a plane that is normal to the longitudinal direction, said second cladding portion extending over said attached sections, said middle section, said engaging portions and said lower contact portions and having an outer surface which is a plane that is normal to the longitudinal direction.

7. The end seal device as claimed in claim 1, wherein said upper portion further includes two deflecting sections each extending from a respective one of said attached sections away from the slider unit to engage said middle section.

8. The end seal device as claimed in claim 1, wherein each of said engaging portions extends from a respective one of said attached sections away from the slider unit to engage a respective one of said lower contact portions.

9. The end seal device as claimed in claim 1, wherein said middle section has an auxiliary through hole which extends from said first major surface to said second major surface, said cladding member further including an auxiliary filling portion which fills said auxiliary through hole and which extends in the longitudinal direction to interconnect said first and second cladding portions.

\* \* \* \* \*